(12) United States Patent
Faye et al.

(10) Patent No.: US 7,465,506 B2
(45) Date of Patent: Dec. 16, 2008

(54) FUEL CELL DEVICE

(75) Inventors: Ian Faye, Stuttgart (DE); Ulrich Gottwick, Stuttgart (DE); Rainer Saliger, Freiberg (DE); Jan-Michael Graehn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 10/782,125

(22) Filed: Feb. 19, 2004

(65) Prior Publication Data
US 2004/0175601 A1 Sep. 9, 2004

(30) Foreign Application Priority Data
Feb. 25, 2003 (DE) ................. 103 07 856

(51) Int. Cl.
*H01M 8/04* (2006.01)
*H01M 8/24* (2006.01)
*H01M 8/12* (2006.01)
*H01M 8/00* (2006.01)
*B60L 11/18* (2006.01)

(52) U.S. Cl. .............. 429/22; 429/25; 429/26; 429/13; 180/65.3

(58) Field of Classification Search ......... None
See application file for complete search history.

(56) References Cited

U.S. PATENT DOCUMENTS

| | | | |
|---|---|---|---|
| 6,586,123 B1 * | 7/2003 | Yi et al. | 429/13 |
| 6,716,550 B1 * | 4/2004 | Kirby | 429/35 |
| 2003/0031916 A1 * | 2/2003 | Haridoss et al. | 429/40 |
| 2004/0146758 A1 * | 7/2004 | Menon et al. | 429/17 |

OTHER PUBLICATIONS

Hirschenhofer, J.H., et al.; Fuel Cells: A Handbook (Revision 3) p. 1-4-1-5.*

* cited by examiner

*Primary Examiner*—Paerick Ryan
*Assistant Examiner*—Karie O'Neill
(74) *Attorney, Agent, or Firm*—Michael J. Striker

(57) ABSTRACT

A fuel cell device has a fuel cell unit including at least two fuel cell elements which are coupled with one another in a way selected from the group consisting of a series coupling, a parallel coupling, and both, for conversion of chemical energy into an electrical energy, and an electronic control unit for controlling individual fuel cell elements of the fuel cell unit.

12 Claims, 1 Drawing Sheet

FUEL CELL DEVICE

BACKGROUND OF THE INVENTION

The present invention relates to fuel cell devices.

More particularly, it relates to a fuel cell unit which has at least two fuel cell elements coupled with one another in series or in parallel, for converting chemical energy into electrical energy.

Fuel cell technology becomes even more important in connection with future vehicle concepts. Fuel cells provide the possibility of direct conversion of chemically bound energy directly into electrical energy, which subsequently can be transformed into a mechanical drive energy by means of an electric motor. In addition, the electrical energy of the fuel cell can be used in some cases for supply of various consumers both for mobile as well as for stationary applications.

In many cases hydrogen-enriched fuel can be generated for fuel cell unit from hydrocarbons, such as natural gas, gasoline, diesel or the like. For this purpose a corresponding conversion unit for converting hydrocarbon-containing material mixtures into a hydrogen-enriched fluid are utilized. Various methods can be used, for example the autothermic reforming, steam reforming, partial oxidation and the like.

A fuel cell unit is generally an electric and/or electronic circuit or coupling of several individual cells. In addition to the electrical circuit, a fuel cell unit includes also a structure which serves for the supply of the electrodes with starting materials and the transportation of the products. Fuel cell devices also include, in addition to the fuel cell unit, corresponding peripheral components, such as for example for gas supply and gas withdrawal, for heat management and for regulation or control.

In practice various identifications are used both for the fuel cell units as well as for individual fuel cells. In the subsequent description the term "fuel cell unit" will be used to include (total-) fuel cell stack or fuel cell pack, and the term "fuel cell element" will be used for individual (partial) fuel cells park or partial stack. What is important is that the fuel cell unit deals with a series and/or a parallel circuitry or coupling of individual fuel cell elements in the sense of the present invention.

When the fuel cell devices are used in vehicles, they deal with a great load spread from an idle running to a maximal load as well as numerous load interactions. In general the fuel cell devices, in particular the fuel cell units including the peripheral component, are designed for maximum required power. Fuel cell units in condition of relatively small loads have a higher efficiency than in condition of maximum loads. To the contrary, the total fuel cell device based on the periphery in the lowermost capacity region has a lower efficiency than in a small and average capacity region.

For example, when the drive motor does not work, for supplying the electrical system components with current or for vehicle air conditioning only relatively low powers, for example in the region of 0-5 kW must be made available from the fuel cell device. To the contrary, for providing the drive energy of the electric motor the power within the region of up to 70 kW and more is required.

In drive systems, the fuel cell devices in general operate with increased pressure of up to 3 bar, to increase the specific power of the system and to maintain the component dimensions as small as possible. The components which produce this pressure frequently have a very low efficiency for the mass current required in the partial load. This significantly increases the total system efficiency primarily in the power class which is relevant for the supply of the electrical system.

Moreover, the total system efficiency in the partial load region additionally reduces because of the cooling circuit of the system.

The relatively low current speeds in the partial load region present are a disadvantage since thereby the delay time during load changes is high and based on this the dynamic condition of the total system or the fuel cell device is significantly worsened.

SUMMARY OF THE INVENTION

Accordingly, it is an object of the present invention to provide a fuel cell device, which eliminates the disadvantages of the prior art.

More particularly, it is an object of the present invention to provide a fuel cell device, wherein a fuel cell unit has at least two fuel cell elements (fuel cells) coupled in series and/or parallel, for converting chemical energy into electrical energy and an electronic control unit for controlling the fuel cell device, which provides a higher total efficiency and a good dynamic behavior when compared with the prior art devices.

In keeping with these objects and with others which will become apparent hereinafter, one feature of the present invention resides, briefly stated, in a fuel cell device which has a fuel cell unit including at least two fuel cell elements which are coupled with one another in a way selected from the group consisting of a series coupling, a parallel coupling, and both, for conversion of chemical energy into an electrical energy; and an electronic control unit for controlling individual fuel cell elements of said fuel cell unit.

In the fuel cell device in accordance with the present invention, the control unit is formed for controlling individual fuel cell components. When the control unit is formed in accordance with the present invention, an adaptation to different partial load operation modes of the total fuel cell device can be realized with an increased total efficiency when compared with the prior art. Correspondingly the fuel cell device can be advantageously operated in accordance with the present invention during idle running stand-by-operation, emergency operation, lower power region, etc.

Preferably, at least one adjusting element is provided for controlling material streams of individual fuel cell elements. In an advantageous manner the adjusting element is associated with two fuel cell elements. It is possible that each adjusting element is provided for controlling an individual material stream such as a reduction means or an oxidation means per fuel cell unit. In general, at least two adjusting elements can be provided for the reduction means as well as for the oxidation means, and in some cases at least one third adjusting element can be provided for cooling means for a corresponding individual fuel cell element. Thereby both the anode gas and the cathode gas and the cooling medium are controllable substantially independently from one another.

In accordance with a preferable embodiment of the invention the adjusting element is formed as a control valve, a throttle valve, or the like. It is thereby possible to use available, conventional standard components in the present invention, so as to provide a particularly favorable embodiment of the invention.

In accordance with a special further embodiment of the present invention, at least two fuel cell elements are provided with significantly different, maximum electrical powers. The significantly different fuel cell elements in advantageous manner can be used in different partial load conditions individually or in combination with one another. This allows in an advantageous manner to provide a relatively fine stepped control or operational mode of the fuel cell unit.

In some cases, the difference of the individual fuel cell elements can constitute at least 5%, 10%, 20% or more with respect to the maximum power. It is possible that the fuel cell components, because of manufacturing tolerances and/or corresponding selection, can have significantly different maximum electrical powers. Thereby, the fuel cell elements can be produced advantageously with greater tolerances, whereby they can be produced especially efficiently.

Preferably, the "worse" fuel cell elements or fuel cell elements with lower power when compared with the "good" fuel cell elements with the higher power can be operated more seldom, so that the service life of the total fuel cell unit is increased in advantageous manner. This means that the "good" fuel cell elements are additionally operated both in the partial load region as well as the full load region, while the "worse" fuel cell elements are operated additionally in the fuel load region. This is particularly advantageous since over the whole service life the "worse" fuel cell elements in general are operated with less operational hours than the "good" fuel cell elements.

Advantageously, at least two fuel cell elements with different catalytic coatings are provided. For example, the different catalytic coatings can be composed of different materials or material compositions or alloys. Thereby with advantageous selection of the materials or material compositions, individual fuel cells can be designed for different requirements and properties or operational conditions. In accordance with the present invention the individual, different fuel cell elements can be controlled individually by means of the preferable control units.

In accordance with a further special embodiment of the present invention, the different fuel cell elements can have at least different quantities of the catalytic coatings. For example, different charging of the catalytic coating can be provided. By means of the different quantities of the catalytic coatings, an adaptation to different loads or operational conditions and/or an advantageous influence of the service life the individual fuel cell components can be realized. Correspondingly, fuel cell elements which are operated relatively frequently can be provided with a relatively great quantity or charge of the catalytically, active coating. To the contrary, individual fuel cell components which are operated relatively seldom, or in other words over a relatively short time, have relatively smaller quantities or charges of the catalytically active coatings. These fuel cell elements can be produced in an especially favorable manner.

In accordance with a further special embodiment of the present invention, at least one pressure generation unit for generation of at least two different working pressures is available. For example, at least in partial load operation, idle running operation, stand-by operation and the like, by means of the inventive pressure generating unit a relatively lower pressure of the operation material stream or individual operation material streams, and in a full load region a relatively higher pressure of the operation material streams is produced by means of the pressure generating unit. Thereby in an advantageous manner an adaptation of specific power of the system to the requirements of the different operational conditions is performed. Preferably, the pressure generation unit includes at least one high pressure- and low pressure generating device whereby an advantageous adaptation of the so-called parasitic loads of the total system can be realized.

In the case of two separate, independent pressure generating unit there is a special advantage that each individual pressure generating component can be adapted in an optimal manner to the predetermined application region or load region. Thereby corresponding power losses or parasitic loads are further reduced. For example, as a high pressure generating devices a compressor or the like can be utilized, which can generate for example the pressure of substantially 3 bar. As a low pressure generating device, for example a relatively simply constructed blower or the like can be provided. For this purpose the use of a relatively small-dimension secondary compressor is recommended with a relatively smaller pressure to be generated at a high efficiency. Preferably, with the low pressure generating device a further transportation of the operation material stream is effected without significant pressure increase relative to the atmospheric pressure.

In accordance with a further advantageous embodiment of the present invention, a current or heat guiding operational mode of the fuel cell device is provided. During the operation of the fuel cell unit for generation of the drive energy for an electric motor or for the supply of consumers, in particular a vehicle or for loading of a corresponding battery, a current supplying operational mode is provided. For this purpose the control or regulation is performed as a function of the current consumption of the total system.

To the contrary, for a heat guiding operational mode, the control unit in accordance with the present invention performs a regulation or control as a function of the heat consumption of the total system. This operational mode is especially advantageous for heating of individual components and/or the interior space of a vehicle. In this case in particular a smallest possible fuel cell element, or in other words having relatively small maximum power, is controlled. The required electrical power can be taken from this small fuel cell element. Thereby the efficiency of the controlled fuel cell element is worsened when compared with electrical current generation, which results in an increased, proportional heat production. Excessive electrical power can be either stored in a battery or converted through an electrical heater in an additional heat.

Generally a fuel cell device in accordance with the present invention can be used as an electrical energy generation device for producing the drive energy of a vehicle by means of an electric motor, and also in combination with an internal combustion engine, in particular gasoline or diesel engine, as a so-called APU. In the last variant, the fuel cell device is provided substantially for power supply of individual components of the vehicle and also in the condition when the internal combustion engine is stopped and/or for supporting of the generator. For example, a fuel cell element in accordance with the present invention can be formed as a so-called PEM-, solid oxide (SOFC), melt carbonate (MCFC), phosphoric acid (PAFC), alkaline (AFC) or direct methanol-fuel cell unit (DMFC).

Basically, the control unit in accordance with the present invention, in addition to controlling of the cathode fluid or anode fluid, can be formed for controlling the cooling or the cooling medium circuit with a corresponding cooling means. The cooling means circuit in accordance with the present invention has a corresponding control element for controlling the cooling medium of the individual fuel cell elements.

In an advantageous manner, the volumes of the fuel stream or operation material stream of the fuel cell unit are efficiently reduced by controlling of the individual fuel cell elements in accordance with the present invention. Therefore, generally an improved dynamic behavior of the whole system is obtained when compared with the prior art and first of all in a partial load region.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
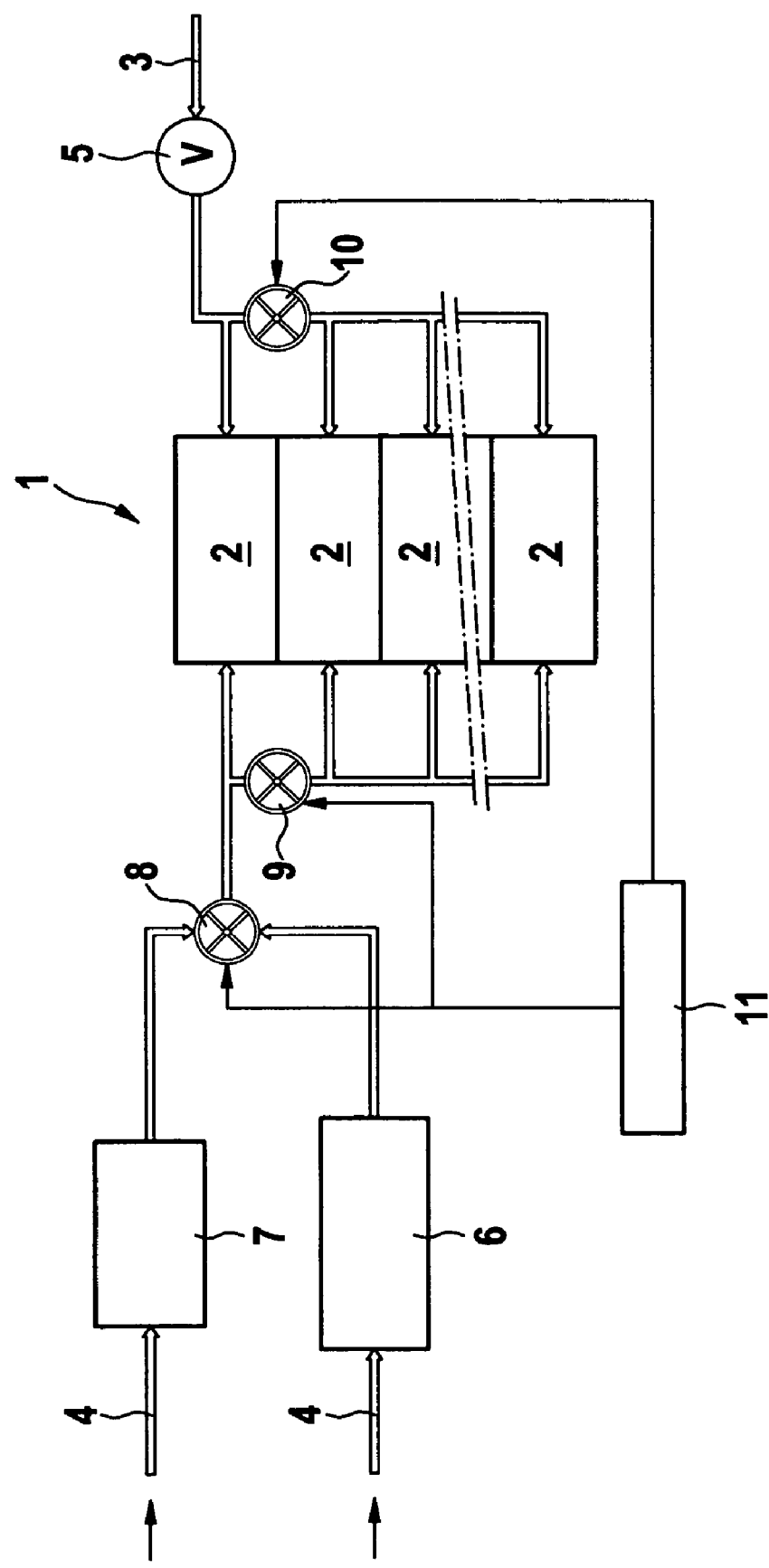
FIG. 1 is a view showing a process flow chart of a fuel cell device in accordance with the present invention.

FIG. 1 is a view showing a flow diagram of the process used for a fuel supply of a fuel cell device. A fuel cell unit 1 includes a plurality of fuel cell elements 2 or fuel cells. The fuel cell elements 2 or partial stacks are electrically connected or coupled with one another in series and/or in parallel, which connections are not illustrated in great detail.

The individual fuel cell elements 2 are supplied with current in parallel with respect to an anode fluid 3 and a cathode fluid 4. As the anode fluid 3 frequently in modern systems a hydrogen-containing gas is utilized, and as the cathode fluid 4 for example air is utilized.

A valve 5, formed for example as a pressure regulating valve, provides regulation or control of the supply of the anode gas or the anode fluid 3. In some cases the anode gas is produced by a not shown reformer or the link, on board of a vehicle and/or stored in a tank on board. Frequently the anode gas is loaded with a pressure, so that the valve 5 controls the operating pressure of the anode gas in dependence on the operational conditions.

The cathode gas is for example supplied by a compressor 6 during a regular driving operation or full load region of the fuel cell unit 1. In the partial region, stand-by-operation, and the like the cathode gas is supplied by a blower 7 of the fuel cell unit 1. For controlling the different operational conditions, an actuator 8 is provided. With the actuator, it is possible to convert the compressor operation to blower operation and vice versa.

The blower operation is provided in particular when the vehicle is stopped or when the electric drive motor is turned off, which is detected by a corresponding sensor. The compressor 6 which is overdimensioned for the partial load region can be turned off, which significantly reduces the power consumption for transportation of the cathode gas. In general the blower 7 is designed in particular for the power requirements of substantially 2-5 kW, wherein a significant pressure build up is not necessarily required.

In order to simplify the electrical energy management and the thermal management in a vehicle when the drive is stopped, when the system is in emergency mode, etc., in accordance with the present invention a part 2 of the fuel cell unit 1 can be supplied with operating materials (fuels) 3, 4. This is shown in FIG. 1 for example by blocking of the individual stack segments or fuel cell elements 2 with actuators 9, 10. Without illustrating details, a cooling medium circuit of the fuel cell units 1 in accordance with the present invention is formed so that the individual fuel cell elements 2 can be correspondingly controlled or cooled. For this purpose corresponding not shown actuators are provided.

Generally, with the individual control of the fuel cell elements 2, a reduction of the output voltage of approximately 400 V to for example 42 V or 14 V and also circulation of smaller quantities of cooling fluid is provided. Correspondingly, in an advantageous manner a reduction of the parasitic loads as well as an increase of the dynamic behavior of the total system is obtained.

Basically, a combination of pressure lowering and turning on or blocking of stack partial segments 2 of the fuel cell unit 1 for ensuring a most efficient operation of the total system can be used both for fuel cell drive systems and for so-called APU systems.

For example, the low pressure operational mode or the uncoupling of a part 2 of the fuel cell unit 1 can be used in advantageous manner for starting of the fuel cell unit 1. For this purpose, with a corresponding, not shown heating unit, the individual fuel cell partial stack 2 can be heated relatively fast and with relatively low energy to operational temperature. First the fuel cell partial stack 2 which is brought into operation generates during the operation waste heat which is used in an especially elegant way for heating the other fuel cell elements 2. Thereby the additionally required heating energy is substantially reduced when compared with the prior art.

FIG. 1 further shows a control device 11 which however for the purpose of clarity of the illustration is connected with the actuators 8, 9 and 10 by a broken line. The broken line symbolizes the control or regulation of the actuators 8, 9, 10. Moreover, the control device in an advantageous manner can be used for control or regulation of further or all components of the fuel cell device or a vehicle.

It will be understood that each of the elements described above, or two or more together, may also find a useful application in other types of constructions differing from the types described above.

While the invention has been illustrated and described as embodied in fuel cell device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A fuel cell device, comprising a fuel cell unit including at least two fuel cells each having an anode and cathode and electrically coupled with one another in a way selected from the group consisting of a series electrical coupling, a parallel electrical coupling, and both, for conversion of chemical energy into an electrical energy; and an electronic control unit for controlling individual fuel cells of said fuel cell unit, wherein a first of said at least two fuel cells is provided with a first catalytic coatings on said anode and said cathode of said first fuel cell and wherein a second of said at least two fuel cells is provided with a second catalytic coatings on said anode and said cathode of said second fuel cell, which are different from said first catalytic coatings on said anode and said cathode of said first fuel cell, and wherein said at least two fuel cells have at least different quantities of the catalytic coatings on said anode and said cathode of said first fuel cell and on said anode and said cathode of said second fuel cell such that a quantity the first catalytic coating on said anode and said cathode of said first fuel cell is different correspondingly from a quantity of the second catalytic coating on said anode and said cathode of said second fuel cell.

2. A fuel cell device as defined in claim 1, wherein said electronic control unit includes at least one control element for controlling material streams of individual ones of said fuel cells.

3. A fuel cell device as defined in claim 2, wherein said control element is arranged between two of said fuel cells.

4. A fuel cell device as defined in claim 1, wherein said control element is formed as a control valve.

5. A fuel cell device as defined in claim 1, wherein at least two of said fuel cells are provided with different, maximum electrical powers.

6. A fuel cell device as defined in claim 1; and further comprising at least one pressure generating unit for generating at least two different operational pressures.

7. A fuel cell device as defined in claim 6, wherein said pressure generating unit includes a high pressure generating element and a low pressure generating element.

8. A fuel cell device as defined in claim 1, wherein said fuel cell unit is formed so as to provide an operation for supplying current.

9. A fuel cell device as defined in claim 1, wherein said fuel cell unit is formed so as to provide an operation for supplying heat.

10. A vehicle, comprising a vehicle part; and a fuel cell device, said fuel cell device including a fuel cell unit having at least two fuel cells which are electrically coupled with one another in a way selected from the group consisting of a series electrical coupling, a parallel electrical coupling, and both, for conversion of chemical energy into an electrical energy; and an electronic control unit for controlling individual fuel cells of said fuel cell unit.

11. A method of operating of a fuel cell device, comprising the steps of providing a fuel cell unit having at least two fuel cells for conversion of the chemical energy into electrical energy; electrically coupling said at least two fuel cells by a connection selected from the group consisting of a serial electrical connection, a parallel electrical connection, and both; and controlling said fuel cell unit by an electronic control unit which controls individual ones of said fuel cells.

12. A fuel cell device, comprising a fuel cell unit including at least two fuel cells each having an anode and a cathode and electrically coupled with one another in a way selected from the group consisting of a series electrical coupling, a parallel electrical coupling, and both, for conversion of chemical energy into an electrical energy; and an electronic control unit for controlling individual fuel cells of said fuel cell unit, wherein a first of said at least two fuel cells is provided with first catalytic coatings on said anode and said cathode of said first fuel cell and wherein second of said at least two fuel cells is provided with a second catalytic coatings on said anode and said cathode of said second fuel cell, which are different from said first catalytic coatings on said anode and said cathode of said first fuel cell, and wherein said at least two fuel cells have at least different quantities of the catalytic coatings on said anode and said cathode of said first fuel cell and on said anode and said cathode of said second fuel cell adapted to different loads or operational conditions, so that one of said at least two fuel cells which is operated relatively frequently is provided with a greater quantity of the catalytic coatings on said anode and said cathode of said second fuel cell, while the other of said at least two fuel cells which is operated relatively seldom is provided with a smaller quantity of the catalytic coatings on its anode and cathode such that a quantity the first catalytic coating on said anode and said cathode of said first fuel cell is different correspondingly from a quantity of the second catalytic coating on said anode and said cathode of said second fuel cell.

* * * * *